US011841790B2

United States Patent
Mitchell et al.

(10) Patent No.: US 11,841,790 B2
(45) Date of Patent: Dec. 12, 2023

(54) ADAPTIVE AUTOMATED TESTING METHODS AND SYSTEMS

(71) Applicant: T-MOBILE USA, INC., Bellevue, WA (US)

(72) Inventors: Michael Mitchell, Bellevue, WA (US); Peter Myron, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 76 days.

(21) Appl. No.: 17/108,124

(22) Filed: Dec. 1, 2020

(65) Prior Publication Data

US 2022/0171695 A1 Jun. 2, 2022

(51) Int. Cl.
*G06F 9/44* (2018.01)
*G06F 11/36* (2006.01)
*G06N 5/01* (2023.01)

(52) U.S. Cl.
CPC .......... *G06F 11/3668* (2013.01); *G06N 5/01* (2023.01)

(58) Field of Classification Search
None
See application file for complete search history.

(56) References Cited

U.S. PATENT DOCUMENTS

| | | | | |
|---|---|---|---|---|
| 6,167,545 A * | 12/2000 | Statovici | ................ | G01R 31/01 714/724 |
| 8,695,005 B2 * | 4/2014 | Bowers | ................ | G06F 9/5072 718/1 |
| 11,347,554 B1 * | 5/2022 | Kotelnikova | ......... | G06F 9/4881 |
| 2007/0169125 A1 * | 7/2007 | Qin | ....................... | G06F 9/5022 718/102 |
| 2013/0007662 A1 * | 1/2013 | Bank | ...................... | G06F 9/451 715/811 |
| 2016/0330134 A1 * | 11/2016 | Almadi | ................. | H04L 47/788 |
| 2018/0349183 A1 * | 12/2018 | Popovic | ................ | G06F 9/4881 |
| 2018/0365073 A1 * | 12/2018 | Zeng | ........................ | G06F 9/50 |
| 2019/0042400 A1 * | 2/2019 | Surace | ................ | G06F 11/3664 |
| 2019/0324881 A1 * | 10/2019 | Buffone | ................ | G06F 11/302 |

(Continued)

FOREIGN PATENT DOCUMENTS

CN 111858288 A * 10/2020

OTHER PUBLICATIONS

"Selenium Grid Tutorial: Hub & Node (with Example)", https://www.guru99.com/introduction-to-selenium-grid.html, retrieved from the internet on Aug. 20, 2020, 18 pages.

(Continued)

*Primary Examiner* — Insun Kang
(74) *Attorney, Agent, or Firm* — Lee & Hayes P.C.

(57) ABSTRACT

Adaptive automated testing methods and systems are disclosed. In an embodiment, an automatic test controller of an automated test system may collect a log of a plurality of actions executed by a plurality of devices of the automated test system and apply a heuristic to the log as the automated test system operates to determine whether to execute a next action by a device of the automated test system. When the next action is to be executed, the automatic test controller automatically directs the device to execute the next action. Otherwise, the automatic test controller indicates the next action was intentionally skipped by recording such omission in the log and automatically skipping the next action.

20 Claims, 5 Drawing Sheets

(56) References Cited

U.S. PATENT DOCUMENTS

2020/0371823 A1\* 11/2020 Magazine ............. G06F 9/4451
2021/0081291 A1\* 3/2021 Anshul ................ G06F 11/273

OTHER PUBLICATIONS

"Selenium Grid Tutorial: Learn to Set it Up", Tiwari et al., Aug. 2, 2019, https://www.browserstack.com/guide/selenium-grid-tutorial, retrieved from the internet on Aug. 20, 2020, 11 pages.
"Selenium Bootcamp", Dave Haeffner, Apr. 20, 2016. Downloadable from <https://wiki.saucelabs.com/display/DOCS/Selenium+Bootcamp+by+Dave+Haeffner>, 26 pages.

\* cited by examiner

ADAPTIVE AUTOMATED TESTING METHODS AND SYSTEMS

FIELD OF THE DISCLOSURE

This disclosure relates generally to automated testing and, more particularly, to adaptive automated testing methods and systems.

BACKGROUND

Many enterprises engage in hardware and software testing. Such testing often involves a combination of hardware tests, tests of user interfaces, tests of software applications executing on the hardware, etc. Generally, automated test rigs are used to run such tests to ensure consistent test coverage of the features. For completeness, thousands of tests may be performed. The resulting testing can consume large quantities of electricity, take long periods of time to complete, require a large quantity of test fixtures and test devices, require lots of physical space, etc.

Accordingly, there is a need to reduce the number of tests that must be carried out.

SUMMARY

To free up testing resources, it is desirable to determine tests or sub-tests that are redundant and therefore need not be run or rerun. Proposed methods and systems log, for example, tests that are run, devices tested, user interface (UI) features tested, test results, etc. Heuristic rules are applied to the logs to identify, sometimes in real time, tests that have been sufficiently tested that can be skipped, have their priority lowered, and/or removed from future test scripts. For example, if all calls within a predetermined period of time to sign into a website application, service, etc. complete successfully, then a future call within a next predetermined period of time to sign into the website, application, service, etc. can be skipped, and marked as skipped or otherwise completed successfully. As another example, when processing a queue of tests to be run on a plurality of devices, heuristics can be used to prioritize testing to the most popular devices. Likewise, when processing a queue of tests to be run on a plurality of web sites or paths within a website, heuristics can be used to prioritize testing to the most popular web sites or paths within a website. In these ways, the number of tests and sub-tests that need to be run can be prioritized and reduced and, thereby, resources saved.

In an embodiment, a method implemented by an automatic test controller of an automated test system includes collecting a log of a plurality of actions executed by a plurality of devices of the automated test system, and applying a heuristic to the log as the automated test system operates to determine whether to execute a next action by a device of the automated test system. When the next action is to be executed, the method includes automatically directing the device to execute the next action. Otherwise, the method includes automatically indicating the next action was intentionally skipped by recording such omission in the log and automatically skipping the next action.

In another embodiment, a non-transitory computer-readable storage medium stores instructions that, when executed, cause a test controller to collect a log of a plurality of actions executed by a plurality of devices of an automated test system, and apply a heuristic to the log as the automated test system operates to determine whether to execute a next action by a device of the automated test system. The instructions, when executed, cause the test controller to, when the next action is to be executed, automatically direct the device to execute the next action. The instructions, when executed, cause the test controller to otherwise automatically indicate the next action was intentionally skipped by recording such omission in the log and automatically skip the next action.

In still another embodiment, a test controller includes a collection module, a heuristic module and a test control module. The collection module is configured to collect a log of a plurality of actions executed by a plurality of devices of an automated test system. The heuristic module is configured to apply a heuristic to the log as the automated test system operates to determine whether to execute a next action by a device of the automated test system. When the next action is to be executed, the test control module is configured to automatically direct the device to execute the next action. Otherwise, the test control module is configured to automatically indicate the next action was intentionally skipped by recording such omission in the log and automatically skip the next action

BRIEF DESCRIPTION OF THE DRAWINGS

The figures described below depict various aspects of the apparatus, methods, and systems disclosed herein. It should be understood that each figure depicts an embodiment of one or more particular aspects of the disclosed apparatus, systems and methods, and that each of the figures is intended to accord with one or more possible embodiments thereof. The figures depict embodiments of this disclosure for purposes of illustration only. One skilled in the art will readily recognize from the following discussion that alternate embodiments of the apparatus, structures and methods disclosed herein may be employed without departing from the principles set forth herein. Wherever possible, the following description refers to the reference numerals included in the following figures, in which features depicted in multiple figures are designated with consistent reference numerals. The figures are not to scale.

DETAILED DESCRIPTION

Reference will now be made in detail to non-limiting examples, some of which are illustrated in the accompanying drawings.

Figure 1:
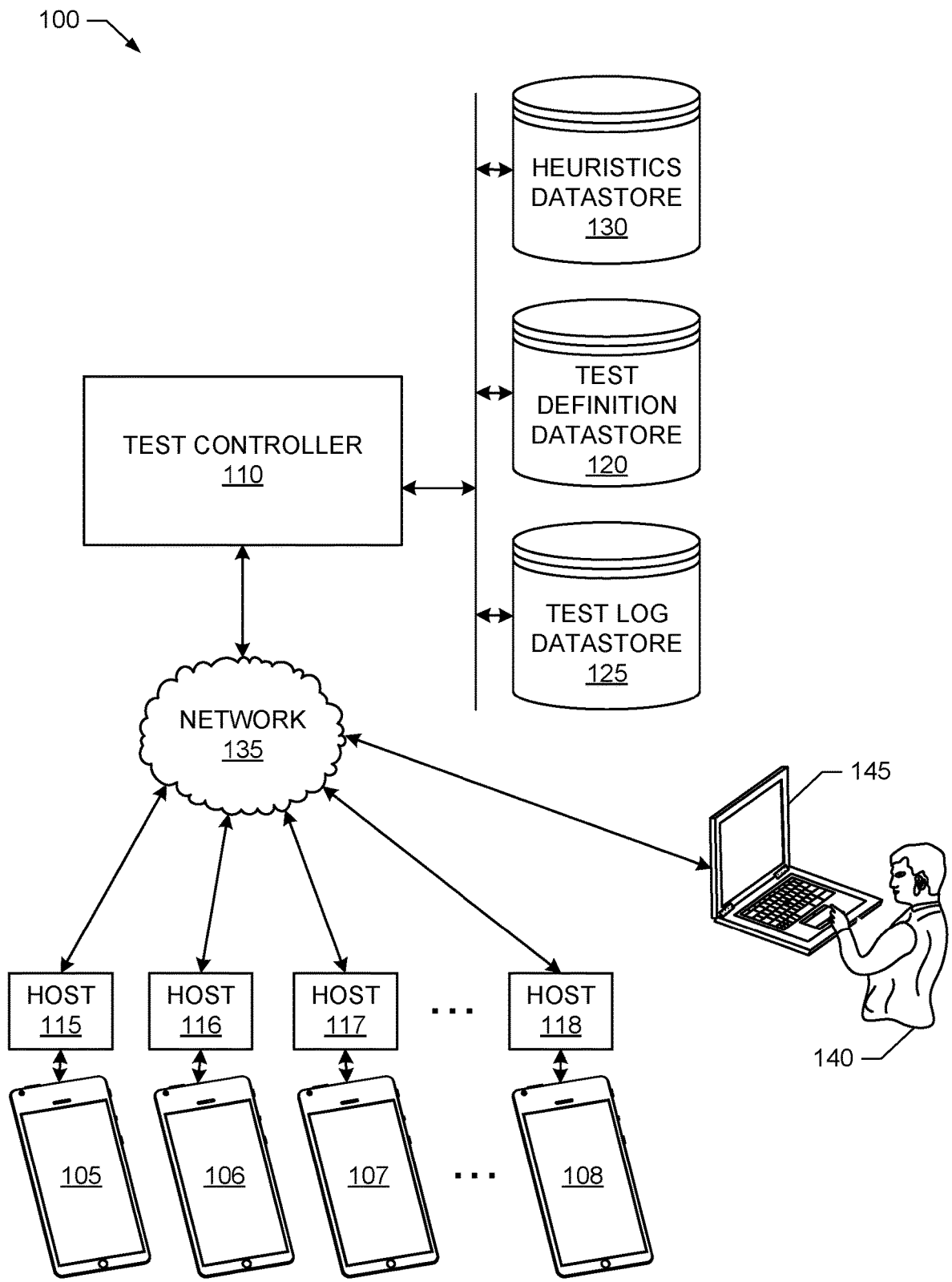
FIG. 1 is a block diagram of an example automated test system, in accordance with disclosed aspects of this disclosure.

FIG. 1 is a block diagram of an example automated test system 100 that runs hardware, UI, website, application, service, software, etc. tests on a plurality of devices, four of which are designated at reference number 105, 106, 107 and 108. The devices 105-108 may be any type(s) of computing devices including, but not limited to, mobile devices, smart devices, smart phones, smart watches, tablets, laptops computers, desktop computers, local and/or remote servers, etc. from any manufacturer(s) running any operating system(s).

To control the automated test system 100, the system 100 includes a test controller 110 and device hosts 115, 116, 117 and 118 for respective ones of the devices 105-108. However, the test controller 110 may control some devices 105-108 directly without an intervening device host. The test controller 110 controls the system 100 to run tests (e.g., actions, features, UI aspects, etc.) defined in a test definition datastore 120. An example test controller 110 may be based on Selenium Grid. For simplicity, the following description will refer simply to tests, which may refer to hardware tests, UI tests, software tests, application tests, features tests, actions, etc. In some examples, a test refers to any action that can be performed on a device 105-108 for which an output can be collected. The output may be collected by the device 105-108, a device host 115-118, or a system with which the device 105-108 is interacting. Example outputs include, but are not limited to, a log, record, video, artifact. For example, if the device 105-108 signs up for a service through an application, a record or artifact of the sign up may be stored by a server (e.g., in a database), which may be subsequently obtained or accessed. For each test in the test definition datastore 120 to be run, the test controller 110 identifies, e.g., based on device model and operating system, which device(s) 105-108 are to perform the test and sends one or more commands to the respective device host(s) 115-118 to run the test on the device(s) 105-108. The device host(s) 115-118, which are programmatically coupled to the device(s) 105-108, are able to control the device(s) 105-108 to run the test, collect outputs and results of the test from the device(s) 105-108, and provide the outputs and results to the test controller 110.

As tests are run (e.g., actions taken, features carried out, UI aspects activated, etc.) by the device hosts 115-118 and results and outputs received at the test controller 110, the test controller 110 compiles the results and outputs in a test log datastore 125 for future analysis and reporting. For each test, the test controller 110 identifies and records whether or not the test ran correctly. Reports may be used to identify any web sites, paths within a website, devices, operating systems, etc. that failed to run one or more tests correctly, to qualify a device model or operating system for use on an operator's cellular network, etc. Reports may be delineated by tests completed successfully, completed unsuccessfully, and skipped.

The test controller 110 applies to the test log datastore 125, sometimes in real time, one or more heuristics stored in a heuristic datastore 130 to identify tests in the test definition datastore 120 that are redundant, already sufficiently tested, unnecessary, tests that should be prioritized, etc. An example heuristic is that if a threshold number of visits to a website, application, service, feature, path, etc. completed without error within a predetermined period of time (as recorded in the test log datastore 125), then subsequent visits are skipped for a predetermined period of time. Another example heuristic is that if a device model is in a list of most popular devices (e.g., by number active on an operator's network, number purchased, ratings, etc.), then its tests are prioritized (e.g., run right away), otherwise the test is run after more popular devices (e.g., devices of which more have been sold into or are present in a marketplace) are tested. Yet another heuristic is that if a website is in a list of most popular websites (e.g., by number of visits to the website in a period of time, amount of traffic to the website, etc.), then its tests are prioritized (e.g., run right away), otherwise the test is run after more popular websites are tested. A further example heuristic is that if an application, service, etc. is on a list of most popular applications, services, etc. then its tests are prioritized (e.g., run right away), otherwise the test is run after more popular applications, services, etc. are tested. A still further example heuristic is that if an application developer is on a list of most popular developers, then its tests are prioritized (e.g., run right away), otherwise the test is run after those of more popular developers are tested. An even further heuristic is that if the test executes poorly (e.g., slowly) more tests like it are executed right away. In some examples, the heuristics use thresholds to determine whether to run or skip a test. In these ways, the number of tests and sub-tests that need to be run can be reduced and resources saved. In some examples, the determination to skip a test resets after a pre-determined period of time.

In some examples, as a test is to be run, the test controller 110 identifies applicable heuristics in the heuristics datastore 130 (e.g., applicable to websites for a test of a website), applies the heuristics to applicable results and outputs in the test log datastore 125 to determine whether to run the test under consideration. If the heuristic determines that the test is to be skipped (i.e., not executed), skipping of the test (i.e., omission of the test) is marked as intentional in the test log datastore 125. If the test is to be executed, commands are sent to the applicable devices 105-108 and/or device hosts 115-118.

Additionally and/or alternatively, as or after test results and outputs are collected, the test controller 110 identifies applicable heuristics in the heuristics datastore 130 (e.g., applicable to websites for a test of a website), applies the heuristics to the applicable results and outputs in the test log datastore 125 to determine whether tests still to be run in the test definition datastore 120 should be executed or skipped. If the heuristics determine that the test is to be skipped (i.e., not executed), skipping of the test (i.e., omission of the test) is marked in the test definition datastore 120. Then, when the test is to be run, the test controller 110 checks whether the test is marked as to be skipped. If the test is marked to be skipped (i.e., not executed), skipping of the test (i.e., omission of the test) is marked as intentional in the test log datastore 125. If the test is to be executed, commands are sent to the applicable devices 105-108 and/or device hosts 115-118.

The application of the heuristics in the heuristics datastore 130 can be done during testing of the devices 105-108. The successful completion of earlier tests can influence whether later tests are executed or not. Tests that execute correctly can cause later duplicate tests to be skipped. This adaptive determination of whether to skip tests allows the system 100 to automatically save resources, reduce the number of tests that must be run, reduce the amount of time to complete testing, etc.

In general, a device host 115-118 can programmatically control all aspects and inputs of a device 105-108, and programmatically observe (e.g., electronically, visually using optical character recognition (OCR), etc.) all outputs and results of a device 105-108 as if they are users. For example, they can provide user inputs, start programs, know what is running on a device, know what is being displayed on a device's screen, know a device's settings, observe inputs, etc. An example device host 115-118 may be implemented using a Raspberry Pi® computing device.

The test controller 110 may communicate with the devices 105-108 and/or device hosts 115-118 via any number and/or type(s) of communication link(s), path(s), network(s) 135, intermediary device(s), communication protocol(s), data access protocol(s), etc. to command tests and collect results and outputs. Communication link(s) may include any number and/or type(s) of wired or wireless communication links including, but not limited, to a fixed wireless connection (e.g., lower power and/or sensitivity), a Bluetooth® connection, a Bluetooth® low energy connection, a near field communication connection, a universal serial bus (USB) cable, etc. The network(s) 135 may include, but are not limited to, a wired or wireless network including a wireless fidelity (Wi-Fi®) network, a local area network (LAN).

In the illustrated example, a user 140 may control aspects of the system 100 via a computing device 145 communicatively coupled to the system 100. The user 140 may use the computing device 145 to define tests in the test definition datastore 120, to view results and outputs in the test log datastore 125, to program the host devices 115-118, to control the test controller 110, to define heuristic rules in the heuristics datastore 130, etc.

Figure 2:
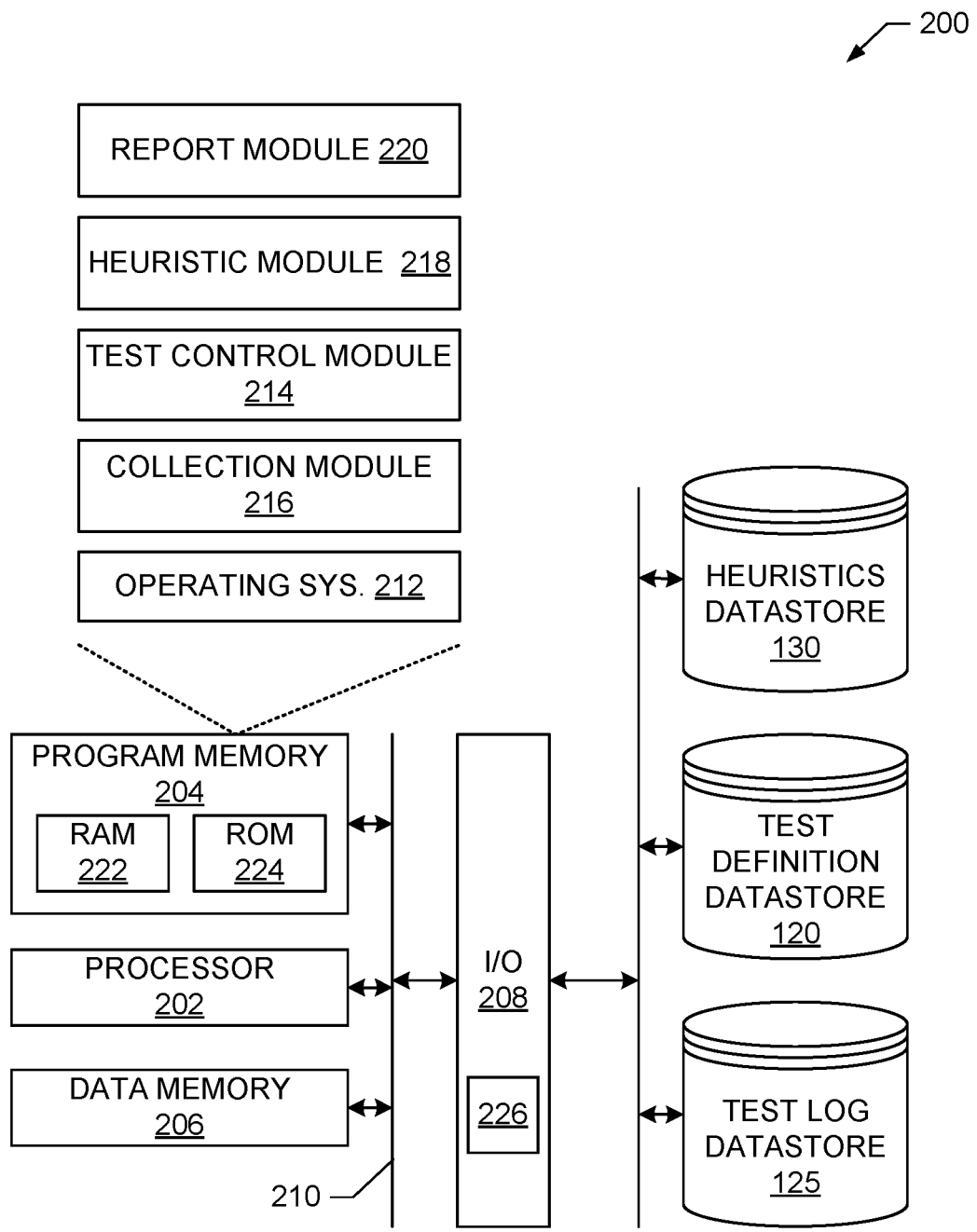
FIG. 2 is a block diagram of an example test controller that may be used to implement the example test controller of FIG. 1.

FIG. 2 is a block diagram of an example test controller 200 that may be used to implement the example test controller 110 of FIG. 1. The test controller 200 may be, for example, a server, a personal computer, a workstation, a self-learning machine (e.g., a neural network), or any other type of computing device.

The test controller 200 includes a processor 202, program memory 204, data memory 206, and an input/output (I/O) circuit 208, all of which are interconnected via an address/data bus 210. The program memory 204 may store software, and machine- or computer-readable instructions, which may be executed by the processor 202.

It should be appreciated that although FIG. 2 depicts only one processor 202, the test controller 200 may include multiple processors 202. The processor 202 of the illustrated example is hardware, and may be a semiconductor based (e.g., silicon based) device. Example processors 202 include a programmable processor, a programmable controller, a graphics processing unit (GPU), a digital signal processor (DSP), an application specific integrated circuit (ASIC), a programmable logic device (PLD), a field programmable gate array (FPGA), a field programmable logic device (FPLD), etc. As discussed below in more detail, in this example, the processor implements an operating system 212, a test control module 214, a collection module 216, a heuristics module 218 and a report module 220.

The program memory 204 may include volatile and/or non-volatile memories, for example, a random-access memory (RAM) 222, a read-only memory (ROM) 222, and/or a cache (not shown) storing one or more corresponding software, or machine- or computer-readable instructions and/or configurations. For example, the program memory 204 stores software, or machine- or computer-readable instructions that may be executed by the processor 202 to implement any of the operating system 212, the test control module 214, the collection module 216, the heuristics module 218 and the report module 220. Modules, systems, etc. instead of and/or in addition to those shown in FIG. 2 may be implemented. The software, machine- or computer-readable instructions may be stored on separate non-transitory computer- or machine-readable storage mediums, devices or disks, or at different physical locations. The data memory 206 may include volatile and/or non-volatile memories, for example, one or more RAMs and/or one or more ROMs.

Example memories 204, 206, 222, 224 may include any number or type(s) of volatile or non-volatile non-transitory computer- or machine-readable storage medium, device or disk such as a semiconductor memories, magnetically readable memories, optically readable memories, hard disk drive (HDD), an optical storage drive, a solid-state storage device, a solid-state drive (SSD), a ROM, a RAM, a compact disc (CD), a compact disc read-only memory (CD-ROM), a digital versatile disk (DVD), a Blu-ray disk, a redundant array of independent disks (RAID) system, a cache, a flash memory, or any other storage device or storage disk in which information may be stored for any duration (e.g., permanently, for an extended time period, for a brief instance, for temporarily buffering, for caching of the information, etc.).

As used herein, the term non-transitory computer-readable medium is expressly defined to include any type of computer-readable storage medium, device and/or disk and to exclude propagating signals and to exclude transmission media. As used herein, the term non-transitory machine-readable medium is expressly defined to include any type of machine-readable storage medium, device and/or disk and to exclude propagating signals and to exclude transmission media. In some embodiments, the processor 202 may also include, or otherwise be communicatively connected to, a database or other data storage mechanism (one or more hard disk drives, optical storage drives, solid state storage devices, CDs, CD-ROMs, DVDs, Blu-ray disks, etc.), such as the test definition datastore 120, the test log datastore 125, and the heuristics datastore 130. When reading any claim of this patent to cover a purely software and/or firmware implementation, at least one of the test control module 214, the collection module 216, the heuristic module 218 and/or the report module 220 is/are hereby expressly defined to include a non-transitory computer readable storage medium device, device or disk such as a memory, a digital versatile disk (DVD), a compact disk (CD), a Blu-ray disk, etc. including the software and/or firmware.

Although FIG. 2 depicts the I/O circuit 208 as a single block, the I/O circuit 208 may include a number of different types of I/O circuits or components that enable the processor 202 to communicate with peripheral I/O devices. Example interface circuits 208 include an Ethernet interface, a universal serial bus (USB), a Bluetooth® interface, a near field communication (NFC) interface, and/or a PCI express interface. The peripheral I/O devices may be any desired type of I/O device such as a keyboard, a display (a liquid crystal display (LCD), a cathode ray tube (CRT) display, a light emitting diode (LED) display, an organic light emitting diode (OLED) display, an in-place switching (IPS) display, a touch screen, etc.), a navigation device (a mouse, a trackball, a capacitive touch pad, a joystick, etc.), a speaker, a microphone, a printer, a button, a communication interface, an antenna, etc.

The I/O circuit 208 may include a number of different network transceivers 226 that enable the test controller 200 to communicate with another computer system, such as the devices 105-108 and/or device hosts 115-118 and the computing system 145 via, e.g., a network (e.g., the communication network such as the network 135). The network transceiver 226 may be a Wi-Fi® transceiver, a Bluetooth® transceiver, an infrared transceiver, a cellular transceiver, an Ethernet network transceiver, an asynchronous transfer mode (ATM) network transceiver, a digital subscriber line (DSL) modem, a dialup modem, a satellite transceiver, a cable modem, etc.

To control an automated test system, such as the system 100 of FIG. 1, the test controller 200 includes the test control module 214. The test control module 214 controls the system 100 to run tests defined in the test definition datastore 120. For each test in the test definition datastore 120 to be run, the controller 110 identifies, e.g., based on device model and operating system, which device(s) 105-108 are to perform the test and sends one or more commands to the respective device host(s) 115-118 to run the test on the device(s) 105-108. The device host(s) 115-118, which are programmatically coupled to the device(s) 105-108, are able to control the device(s) 105-108 to run the test, collect outputs and results of the tests from the device(s) 105-108, and provide the outputs and results to the test controller 110.

To collect test results and outputs, the example test controller 200 includes the collection module 216. As tests are run by the devices 105-108 and/or device hosts 115-118 and results and outputs received, the collection module 216 compiles the results and outputs in the test log datastore 125 for future analysis and reporting. For each test, the collection module 216 identifies and records whether or not the test ran correctly.

To report test outputs and results, the example test controller 200 includes the report module 220. The report module 220 generates reports that may be used to identify any web sites, devices, operating systems, etc. that failed to run one or more tests correctly, to qualify a device model or operating system for use on an operator's cellular network, etc. Reports may also delineate test results by whether the test was completed successfully, completed unsuccessfully or skipped. Example reports include, but are not limited to, a database, a log, HTML code, a portable document format (PDF) file, etc.

To apply heuristics to determine which tests to run, the example test controller 200 includes the heuristic module 218. The heuristic module 218 applies to the test log datastore 125, sometimes in real time, one or more heuristics stored in a heuristic datastore 130 to identify tests in the test definition datastore 120 that are redundant, sufficiently tested, unnecessary, tests that should be prioritized, etc.

In some examples, as a test is to be run, the heuristic module 218 identifies applicable heuristics in the heuristics datastore 130 (e.g., applicable to websites for a test of a website), applies the heuristics to applicable results and outputs in the test log datastore 125 to determine whether to run the test under consideration. If the heuristic determines that the test is to be skipped (i.e., not executed), skipping of the test (i.e., omission of the test) is marked as intentional in the test log datastore 125. If the test is to be executed, the test control module 214 sends commands to the applicable devices 105-108 and/or device hosts 115-118 to run the tests.

Additionally and/or alternatively, as or after test results and outputs are collected, the heuristic module 218 identifies applicable heuristics in the heuristics datastore 130 (e.g., applicable to websites for a test of a website), applies the heuristics to the applicable results and outputs in the test log datastore 125 to determine whether tests still to be run in the test definition datastore 120 should be executed or skipped. If the heuristics determine that the test is to be skipped (i.e., not executed), skipping of the test (i.e., omission of the test) is marked in the test definition datastore 120. Then, when the test is to be run, the test controller 110 checks whether the test is marked as to be skipped. If the test is marked to be skipped (i.e., not executed), skipping of the test (i.e., omission of the test) is marked as intentional in the test log datastore 125. If the test is to be executed, the test control module 214 sends commands to the applicable devices 105-108 and/or device hosts 115-118 to run the tests.

Figure 3:
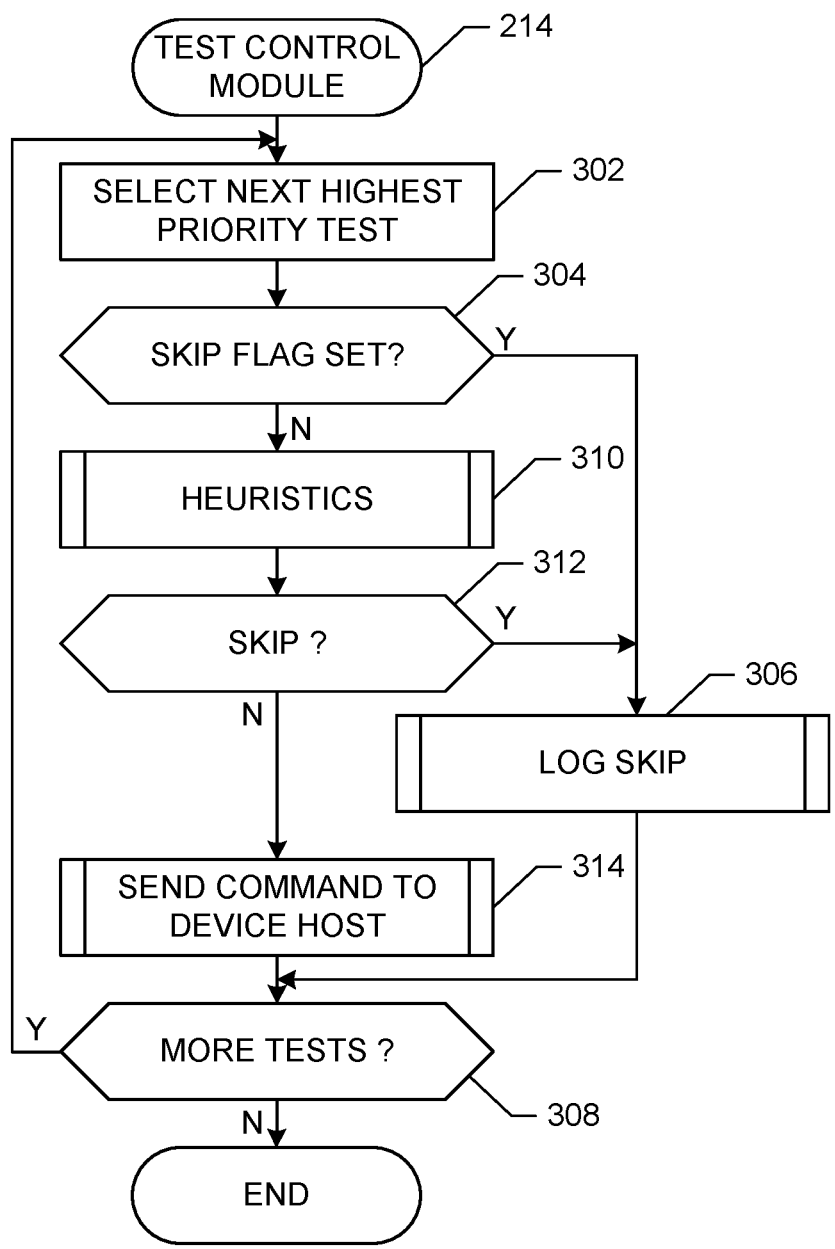
FIG. 3 is an example flowchart representative of example processes, methods, etc. for controlling testing of the automated test system of FIG. 1.

A flowchart representative of example hardware logic, software, computer- or machine-readable instructions, hardware implemented state machines, and/or any combination thereof for implementing the test control module 214 of FIG. 2 is shown in FIG. 3. The software instructions may be an executable program or portion of an executable program for execution by a computer processor such as the processor 202 shown in the example test controller 200. The program may be embodied in software or instructions stored on a non-transitory computer-readable storage medium such as a CD, a CD-ROM, a floppy disk, a hard drive, a DVD, a Blu-ray disk, or a memory associated with the processor 202, but the entire program and/or parts thereof could alternatively be executed by a device other than the processor 202 and/or embodied in firmware or dedicated hardware. Further, although the example program is described with reference to the flowchart illustrated in FIG. 3, many other methods of implementing the example test control module 214 may alternatively be used. For example, the order of execution of the blocks may be changed, and/or some of the blocks described may be changed, eliminated, or combined. Additionally, and/or alternatively, any or all of the blocks may be implemented by one or more hardware circuits (e.g., discrete and/or integrated analog and/or digital circuitry, an FPGA, an ASIC, a PLD, an FPLD, a comparator, an operational-amplifier (op-amp), a logic circuit, etc.) structured to perform the corresponding operation without executing software or firmware.

The example program of FIG. 3 begins with the test control module 214 selecting the next highest priority test in the test definition datastore 120 to be executed (block 302). If no tests are prioritized, then the next test in the test definition datastore 120 is selected. If the test was previously marked skip by the heuristic module 218 (block 304), the test control module 214 logs the intentional skip in the test log datastore 125 (block 306), and control proceeds to block 308 to determine if there are more undone tests.

If there are more undone tests (block 308), control returns to block 302 to select the next (highest priority) test (block 302). If all tests are done (block 308), then control exits from the example program of FIG. 3.

Returning to block 304, if the test is not marked skip (block 304), the heuristic module 218 may apply one or more heuristics applicable to the test to determine whether the test should be skipped (block 310). If the heuristic module 218 determines the test is to be skipped (block 312), the test control module 214 logs the intentional skip in the test log datastore 125 (block 306), and control proceeds to block 308 to determine if there are more undone tests.

If the heuristic module 218 does not determine the test is to be skipped (block 312), the test control module 214 sends commands to one or more devices 105-108 and/or device hosts 115-118 to execute the test on the applicable devices 105-108 (block 314), and control proceeds to block 308 to determine if there are more undone tests.

Figure 4:
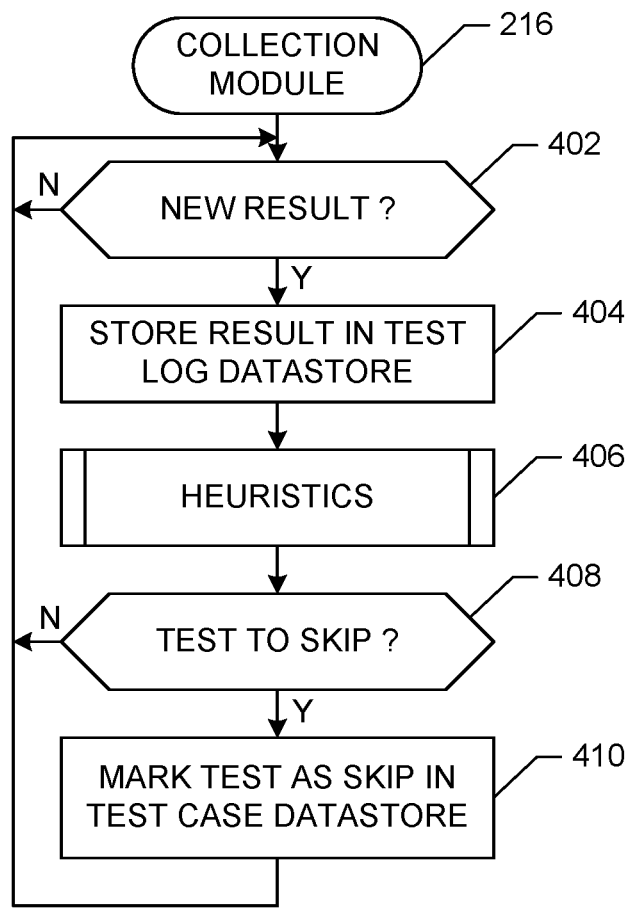
FIG. 4 is an example flowchart representative of example processes, methods, etc. for collecting test results for the automated test system of FIG. 1.

A flowchart representative of example hardware logic, software, computer- or machine-readable instructions, hardware implemented state machines, and/or any combination thereof for implementing the collection module 216 of FIG. 2 is shown in FIG. 4. The software instructions may be an executable program or portion of an executable program for execution by a computer processor such as the processor 202 shown in the example test controller 200. The program may be embodied in software or instructions stored on a non-transitory computer-readable storage medium such as a CD, a CD-ROM, a floppy disk, a hard drive, a DVD, a Blu-ray disk, or a memory associated with the processor 202, but the entire program and/or parts thereof could alternatively be executed by a device other than the processor 202 and/or embodied in firmware or dedicated hardware. Further, although the example program is described with reference to the flowchart illustrated in FIG. 4, many other methods of implementing the example collection module 216 may alternatively be used. For example, the order of execution of the blocks may be changed, and/or some of the blocks described may be changed, eliminated, or combined. Additionally, and/or alternatively, any or all of the blocks may be implemented by one or more hardware circuits (e.g., discrete and/or integrated analog and/or digital circuitry, an FPGA, an ASIC, a PLD, an FPLD, a comparator, an operational-amplifier (op-amp), a logic circuit, etc.) structured to perform the corresponding operation without executing software or firmware.

The example program of FIG. 4 begins with the collection module 216 waiting to receive test results and outputs (block 402). When test results and outputs are received (block 402), the collection module 214 stores the test results and outputs in the test log datastore 125 (block 404). The heuristic module 218 may apply one or more heuristics applicable to the returned test results and outputs to determine whether another test in the test definition datastore 120 should be skipped (block 406). If a test is identified to be skipped (block 408), the test is marked for skipping in the test definition datastore 120 (block 410) and control returns to block 402 to wait for more test results or outputs. If a test is not identified to skip (block 408), control returns to block 402.

Figure 5:
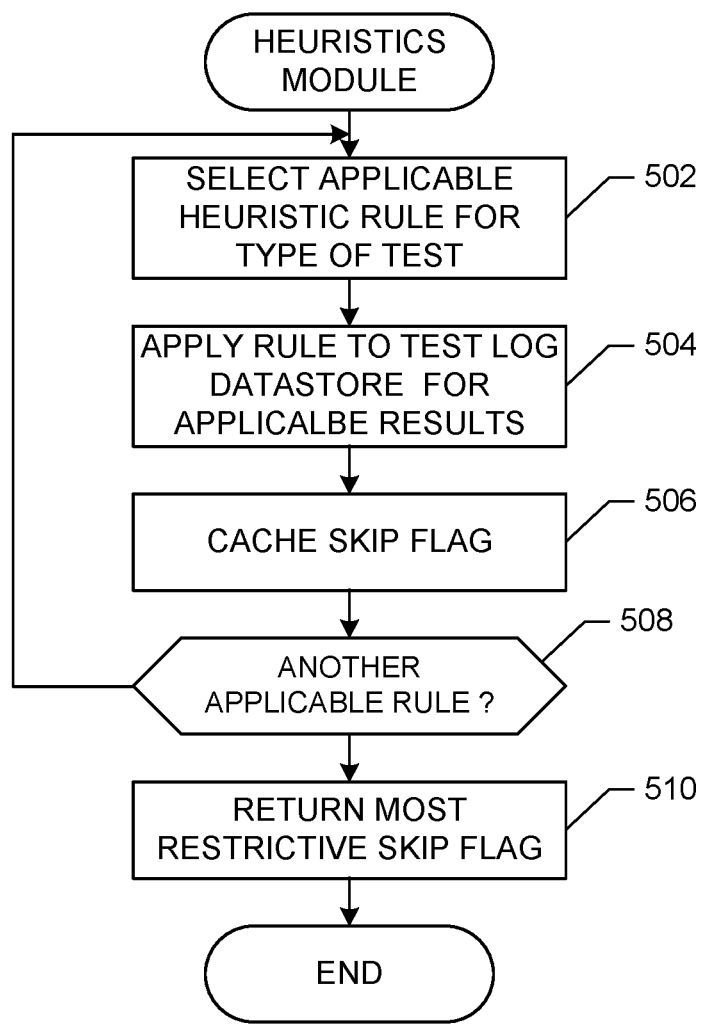
FIG. 5 is an example flowchart representative of example processes, methods, etc. for applying heuristics for the automated test system of FIG. 1.

A flowchart representative of example hardware logic, software, computer- or machine-readable instructions, hardware implemented state machines, and/or any combination thereof for implementing the heuristic module 218 of FIG. 2 is shown in FIG. 5. The software instructions may be an executable program or portion of an executable program for execution by a computer processor such as the processor 202 shown in the example test controller 200. The program may be embodied in software or instructions stored on a non-transitory computer-readable storage medium such as a CD, a CD-ROM, a floppy disk, a hard drive, a DVD, a Blu-ray disk, or a memory associated with the processor 202, but the entire program and/or parts thereof could alternatively be executed by a device other than the processor 202 and/or embodied in firmware or dedicated hardware. Further, although the example program is described with reference to the flowchart illustrated in FIG. 5, many other methods of implementing the example heuristic module 218 may alternatively be used. For example, the order of execution of the blocks may be changed, and/or some of the blocks described may be changed, eliminated, or combined. Additionally, and/or alternatively, any or all of the blocks may be implemented by one or more hardware circuits (e.g., discrete and/or integrated analog and/or digital circuitry, an FPGA, an ASIC, a PLD, an FPLD, a comparator, an operational-amplifier (op-amp), a logic circuit, etc.) structured to perform the corresponding operation without executing software or firmware.

The example program of FIG. 5 begins with the heuristic module 218 selecting a heuristic rule applicable to a type of test to be run (block 502) and applying the selected rule to applicable test results and outputs in the test log datastore 125 (block 504). Any resulting skip or prioritization of the test is held (e.g., stored, cached, etc.) (block 506). If there are more applicable heuristic rules (block 508), control returns to block 502 to select a next applicable heuristic rule (block 502). In some examples, any remaining heuristic rules may be ignored once a test has been flagged to be skipped, thereby further improving processing efficiency.

When all applicable heuristic rules have been applied (block 508), the results are returned for use in prioritizing or skipping the tests (510). In some examples, the most restrictive held prioritization or skip result is applied to the test to be run. For example, if one rule identifies a test to skip, the test is identified for skipping even if other rules do not identify the test for skipping.

This detailed description is to be construed as example only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for systems and methods according to the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation, and details of the techniques disclosed herein without departing from the spirit and scope defined in the appended claims.

Although individual operations of one or more methods are illustrated and described as separate operations, one or more of the individual operations may be performed concurrently, and nothing requires that the operations be performed in the order illustrated. Structures and components presented as separate components in example configurations may be implemented as a combined structure or component. Similarly, structures and components presented as a single component may be implemented as separate components. These and other variations, modifications, additions, and improvements fall within the scope of the subject matter herein.

To the extent that any term recited in the claims at the end of this disclosure is referred to in this disclosure in a manner consistent with a single meaning, that is done for the sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Use of "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise. A device or structure that is "configured" in a certain way is configured in at least that way, but may also be configured in ways that are not listed.

Further, as used herein, the expressions "in communication," "coupled" and "connected," including variations thereof, encompasses direct communication and/or indirect communication through one or more intermediary components, and does not require direct mechanical or physical (e.g., wired) communication and/or constant communication, but rather additionally includes selective communication at periodic intervals, scheduled intervals, aperiodic intervals, and/or one-time events. The embodiments are not limited in this context.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

Moreover, in the foregoing specification, specific embodiments have been described. However, one of ordinary skill in the art appreciates that various modifications and changes can be made in view of aspects of this disclosure without departing from the scope of the invention as set forth in the claims below. Accordingly, the specification and figures are to be regarded in an illustrative rather than a restrictive sense, and all such modifications made in view of aspects of this disclosure are intended to be included within the scope of present teachings.

Additionally, the benefits, advantages, solutions to problems, and any element(s) that may cause any benefit, advantage, or solution to occur or become more pronounced are not to be construed as a critical, required, or essential features or elements of any or all the claims.

What is claimed is:

1. A method comprising:
   collecting, by an automatic test controller of an automated test system, a log of a plurality of actions executed by a plurality of devices of the automated test system;
   obtaining, by the automatic test controller, priority data associated with the plurality of devices, wherein the priority data indicates an expected level of use of each of a plurality of applications for each of the plurality of devices;
   selecting, by the automatic test controller, a next action by a device of the plurality of devices for evaluation for testing based upon the priority data indicating the expected level of use of the plurality of applications, wherein the next action is selected based upon an association of the next action with an application of the plurality of applications;
   applying, by the automatic test controller, a heuristic to the log and the priority data associated with the next action by the device of the plurality of devices as the automated test system operates to determine whether to execute the next action by the device;
   when the heuristic applied on the test controller determines the next action is to be executed, automatically directing, by the automatic test controller, the device to execute the next action; and
   when the heuristic applied on the test controller determines the next action is not to be executed, automatically indicating, by the automatic test controller, the next action was intentionally skipped by recording such omission in the log and automatically skipping, by the automatic test controller, the next action.

2. The method of claim 1, wherein the heuristic determines the next action is not to be executed based upon a number of times the next action is identified in the log as successfully executed during a predetermined period of time.

3. The method of claim 2, wherein the heuristic resets after another predetermined period of time.

4. The method of claim 1, wherein the heuristic determines the next action is to be executed by the device based upon a number of instances of the device in a marketplace.

5. The method of claim 1, wherein the heuristic determines the next action is to be executed by the device based upon a level of traffic to at least one of a website, application or service associated with the next action.

6. The method of claim 1, wherein the plurality of actions includes at least one of a hardware test or an execution of at least one of a web page, application or service.

7. The method of claim 1, further comprising presenting a test report that delineates successfully completed actions, skipped actions, and unsuccessfully completed actions.

8. A non-transitory computer-readable storage medium comprising instructions that, when executed, cause a test controller to:
   collect a log of a plurality of actions executed by a plurality of devices of an automated test system;
   obtain priority data associated with the plurality of devices, wherein the priority data indicates an expected level of use of each of a plurality of applications for each of the plurality of devices;
   select a next action by a device of the plurality of devices for evaluation for testing based upon the priority data indicating the expected level of use of the plurality of applications, wherein the next action is selected based upon an association of the next action with an application of the plurality of applications;
   apply a heuristic to the log and the priority data associated with the next action by the device of the plurality of devices as the automated test system operates to determine whether to execute the next action by the device;
   when the heuristic determines the next action is to be executed, automatically direct the device to execute the next action; and
   when the heuristic determines the next action is not to be executed, automatically indicate the next action was intentionally skipped by recording such omission in the log and automatically skip the next action.

9. The non-transitory computer-readable storage medium of claim 8, wherein the instructions, when executed, cause the test controller to apply the heuristic by determining the next action is not to be executed based upon a number of times the next action is identified in the log as successfully executed during a predetermined period of time.

10. The non-transitory computer-readable storage medium of claim 9, wherein the instructions, when executed, cause the test controller to reset the heuristic after another predetermined period of time.

11. The non-transitory computer-readable storage medium of claim 8, wherein the instructions, when executed, cause the test controller to apply the heuristic by determining the next action is to be executed by the device based upon a number of instances of the device in a marketplace.

12. The non-transitory computer-readable storage medium of claim 8, wherein the instructions, when executed, cause the test controller to apply the heuristic by determining the next action is to be executed by the device based upon a level of traffic to at least one of a website, application or service associated with the next action.

13. The non-transitory computer-readable storage medium of claim 8, wherein the plurality of actions includes at least one of a hardware test or an execution of at least one of a web page, application or service.

14. The non-transitory computer-readable storage medium of claim 8, wherein the instructions, when executed, cause the test controller to present a test report that delineates successfully completed actions, skipped actions, and unsuccessfully completed actions.

15. A test controller, comprising:
one or more processors;
a program memory storing instructions that, when executed by the one or more processors, cause the test controller to:
  collect a log of a plurality of actions executed by a plurality of devices of an automated test system;
  obtain priority data associated with the plurality of devices, wherein the priority data indicates an expected level of use of each of a plurality of applications for each of the plurality of devices;
  select a next action by a device of the plurality of devices for evaluation for testing based upon the priority data indicating the expected level of use of the plurality of applications, wherein the next action is selected based upon an association of the next action with an application of the plurality of applications;
  apply a heuristic to the log and the priority data associated with the next action by the device of the plurality of devices as the automated test system operates to determine whether to execute the next action by the device;
  when the heuristic determines the next action is to be executed, automatically direct the device to execute the next action; and
  when the heuristic determines the next action is not to be executed, automatically indicate the next action was intentionally skipped by recording such omission in the log and automatically skip the next action.

16. The test controller of claim 15, wherein the instructions, when executed, cause the test controller to apply the heuristic by determining the next action is not to be executed based upon a number of times the next action is identified in the log as successfully executed during a predetermined period of time.

17. The test controller of claim 16, wherein the instructions, when executed, cause the test controller to reset the heuristic after another predetermined period of time.

18. The test controller of claim 15, wherein the instructions, when executed, cause the test controller to apply the heuristic by determining the next action is to be executed by the device based upon a number of instances of the device in a marketplace.

19. The test controller of claim 15, wherein the plurality of actions includes at least one of a hardware test or an execution of at least one of a web page, application or service.

20. The test controller of claim 15, wherein the instructions, when executed, cause the test controller to present a test report that delineates successfully completed actions, skipped actions, and unsuccessfully completed actions.

* * * * *